(12) United States Patent
Helak et al.

(10) Patent No.: US 9,122,400 B2
(45) Date of Patent: Sep. 1, 2015

(54) MANAGING DATA SET VOLUME TABLE OF CONTENTS

(75) Inventors: Dustin A. Helak, Tucson, AZ (US);
Miguel A. Perez, Tucson, AZ (US);
David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/567,549

(22) Filed: Aug. 6, 2012

(65) Prior Publication Data

US 2014/0040578 A1 Feb. 6, 2014

(51) Int. Cl.
*G06F 3/06* (2006.01)

(52) U.S. Cl.
CPC .............. *G06F 3/061* (2013.01); *G06F 3/0614* (2013.01); *G06F 3/0643* (2013.01); *G06F 3/0676* (2013.01); *G06F 2212/1004* (2013.01)

(58) Field of Classification Search
None
See application file for complete search history.

(56) References Cited

U.S. PATENT DOCUMENTS

| | | | | |
|---|---|---|---|---|
| 4,408,273 A | * | 10/1983 | Plow | 1/1 |
| 5,983,317 A | * | 11/1999 | Kanda et al. | 711/112 |
| 6,189,015 B1 | * | 2/2001 | Reed et al. | 1/1 |
| 6,675,175 B2 | * | 1/2004 | Branch et al. | 1/1 |
| 7,146,475 B2 | * | 12/2006 | Perego | 711/162 |
| 7,624,127 B2 | * | 11/2009 | Smith | 1/1 |
| 7,631,206 B2 | * | 12/2009 | Rothman et al. | 713/320 |
| 7,783,609 B2 | | 8/2010 | Chauvet et al. | |
| 2010/0185697 A1 | * | 7/2010 | Lehr et al. | 707/803 |
| 2011/0283077 A1 | | 11/2011 | Cammarata et al. | |

OTHER PUBLICATIONS

IBM. "DFSMS: z/OS concepts". Apr. 9, 2010.*
IBM. "DFSMS: Managing Catalogs". Jul. 9, 2010.*
IBM. "DFSMS: Using Data Sets". Jun. 29, 2010.*
IBM. "DFSMS: DFSMSdfp Advanced Services". May 18, 2003.*
Pucciani, Gianni. "Consistency of Replicated Datasets in Grid Computing." Dec. 4, 2009.*

* cited by examiner

*Primary Examiner* — Charles Rones
*Assistant Examiner* — Hewy Li
(74) *Attorney, Agent, or Firm* — Kunzler Law Group (57) ABSTRACT

For managing a data set volume table of contents, a management module creates a data set volume table of contents (DSVTOC) for a data set residing on a volume. The DSVTOC resides in a virtual storage access method (VSAM) system and includes a DSVTOC index, DSVTOC cluster data, and DSVTOC data for the data set. A copy module maintains a copy of the DSVTOC on the volume.

16 Claims, 8 Drawing Sheets

MANAGING DATA SET VOLUME TABLE OF CONTENTS

FIELD

The subject matter disclosed herein relates to a table of contents and more particularly relates to a data set volume table of contents.

BACKGROUND

Description of the Related Art

Operating systems maintain table of content information so that data sets can be located and accessed in storage devices. Efficient maintenance of table of content information improves data processing system reliability and performance.

BRIEF SUMMARY

An apparatus for managing a data set volume table of contents is disclosed. A computer readable storage medium stores program code executable by a processor. The program code comprises a management module and a copy module. The management module creates a data set volume table of contents (DSVTOC) for a data set residing on a volume. The DSVTOC resides in a virtual storage access method (VSAM) system and includes a DSVTOC index, DSVTOC cluster data, and DSVTOC data for the data set. The copy module maintains a copy of the DSVTOC on the volume. Methods and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1:
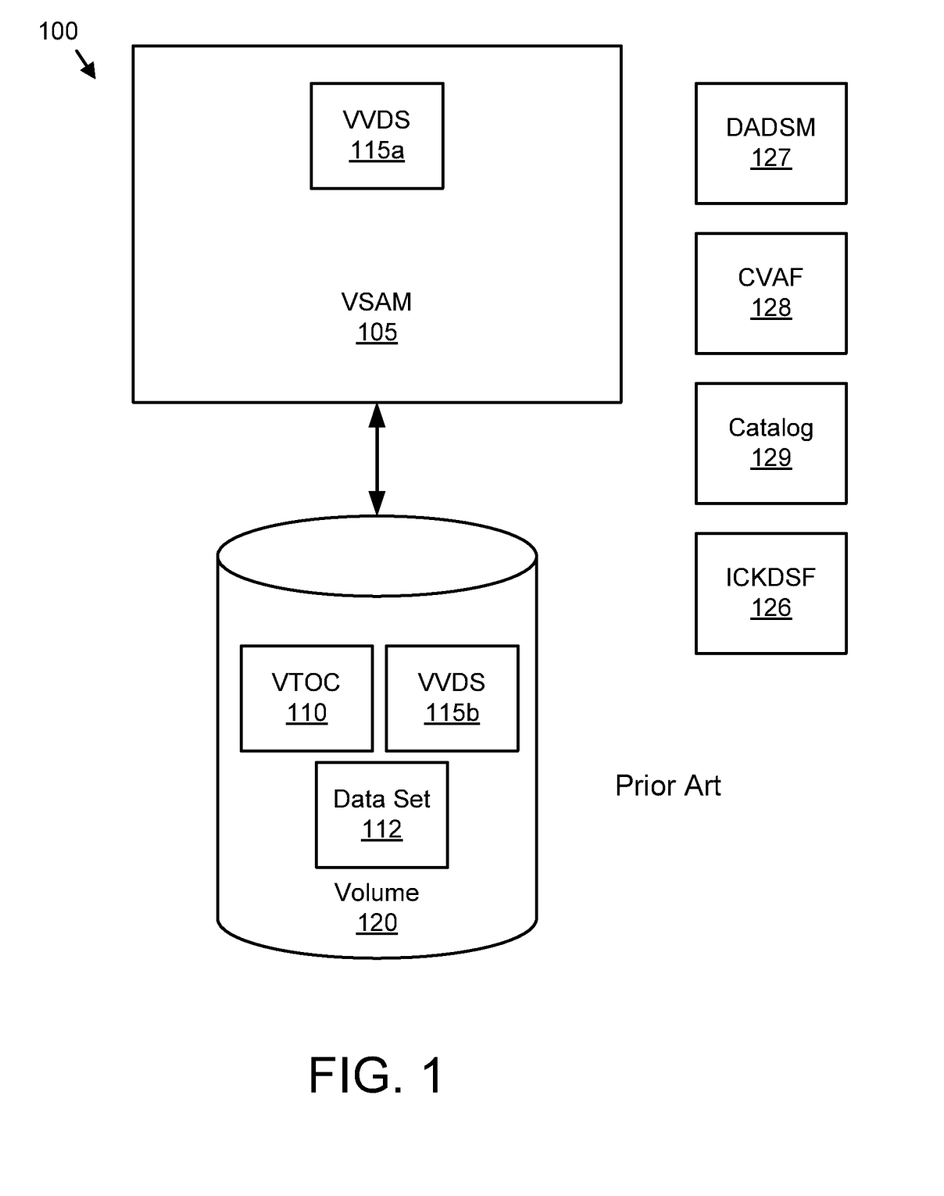
FIG. 1 is a schematic block diagram illustrating one embodiment of a data processing system.

FIG. 1 is a schematic block diagram illustrating one embodiment of a data processing system 100 of the prior art. The system 100 includes a virtual storage access method (VSAM) 105 and at least one volume 120. In one embodiment, the system 100 comprises a Z/OS® operating system produced by International Business Machines Corporation of Armonk, N.Y.

The VSAM 105 includes a VSAM volume data set (VVDS) 115. The VVDS 115*a* includes data describing system managed storage (SMS) attributes of a data set 112. A copy of the VVDS 115*b* is stored on the volume 120. The system 100 also includes a catalog 129, a common volume table of contents access facility (CVAF) 128, a direct access device space management (DADSM) 127, and a device support facility (ICKDSF) 126 that will be described hereafter.

The volume 120 may be a logical volume, a physical volume, or combinations thereof. Physical volumes may be stored on hard disk drives, optical storage devices, micromechanical storage devices, semiconductor storage devices, or combinations thereof. The volume 120 may store the data set 112. The data set 112 may be stored in one or more extents. An extent may be a track, an address range, or the like. The volume 120 includes the VVDS 115*b* and a volume table of contents (VTOC) 110.

The VTOC 110 includes data describing the basic data set allocation attributes. In addition, the VTOC records the low/high cylinder track locations (CCHH) of each extent of the data set 112. When the data set 112 is stored across multiple data volumes 120, the VTOC 110 may record each volume 120 where the data set 112 is stored and the CCHH of each extent of the data set 112. Together, the VVDS 115 and VTOC 110 include the data set control block (DSCB) data structures need to fulfill CVAF and CATALOG requests.

Unfortunately, both the VTOC 110 and the VVDS 115 are serialized separately. As a result, if multiple applications attempt to access the VTOC 110 and VVDS 115 in different orders, there may be contention and/or deadlock in accessing the VTOC 110 and the VVDS 115. The embodiments described herein eliminate potential contention and thus improve reliability as will be described hereafter.

Figure 2:
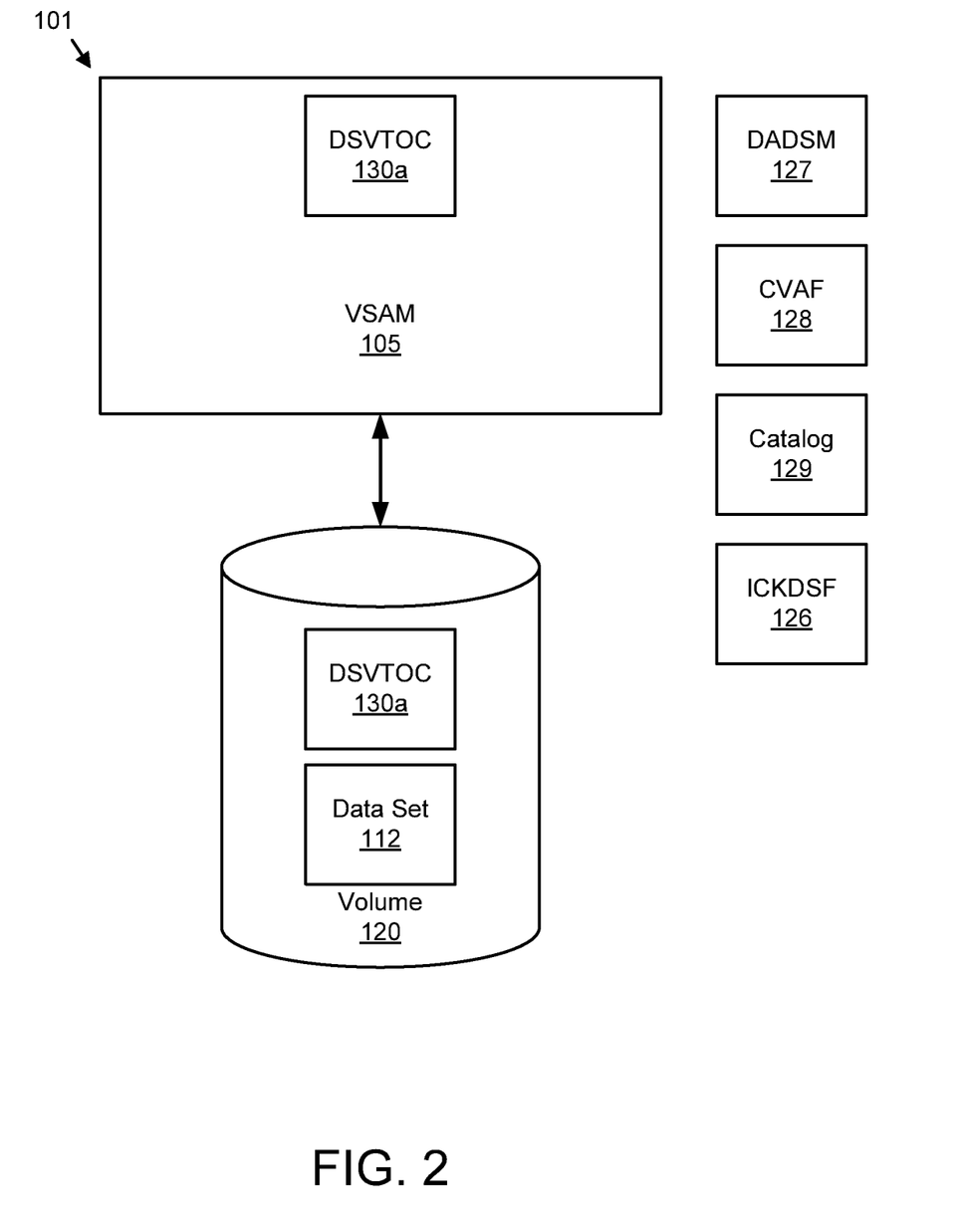
FIG. 2 is a schematic block diagram illustrating one embodiment of a data processing system.

FIG. 2 is a schematic block diagram illustrating one embodiment of a data processing system 101. The system 101 includes the VSAM 105 and the volume 120 of FIG. 1. In one embodiment, the system 101 comprises a Z/OS® operating system produced by International Business Machines Corporation of Armonk, N.Y.

The DSVTOC 130 comprises all data set level information (DLI) stored in the VTOC 110 and the VVDS 115. Copies of the DSVTOC 130 are stored on the VSAM 105 and the volume 120. Each DSVTOC 130 may include device characteristics and volume free space information as will be described hereafter.

The system 101 also includes the catalog 129, the CVAF 128, the DADSM 127, and the ICKDSF 126. The catalog 129, CVAF 128, DADSM 127, and ICKDSF 126 may perform functions and store data. In one embodiment, the catalog 129, CVAF 128, DADSM 127, and ICKDSF 126 reside in the VSAM 105.

The catalog 129 may include catalog entries for one or more data sets 112. Each catalog entry may further track of sequential volume order for each data set 112. The DADSM 127 may manage DSCBs for all data sets 112. The DSCB may describe allocation attributes and physical extent ranges for a specified volume 120.

The CVAF 128 may be employed by the DADSM 127 to perform physical input-output operations using the VTOC 110 and a VTOC index (VTOCIX) (not shown).

In one embodiment, the DSVTOC 130 is a VSAM keyed sequenced data set (KSDS). Thus the DSVTOC 130 may be able to employ VSAM performance features and size extensions. Alternatively, the DSVTOC 130 may be a VSAM entry sequenced data set.

Figure 3:
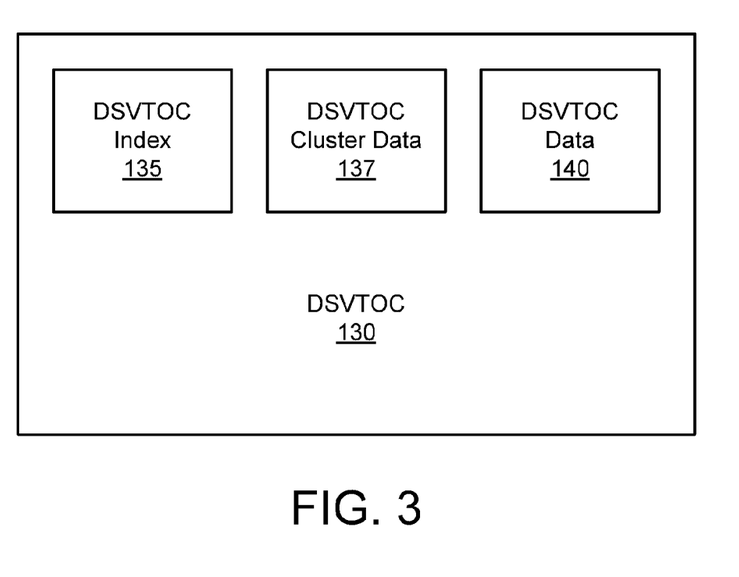
FIG. 3 is a schematic block diagram illustrating one embodiment of a data set volume table of contents (DSVTOC)

FIG. 3 is a schematic block diagram illustrating one embodiment of the DSVTOC 130. The DSVTOC 130 may be of DSVTOC 130 of FIG. 2. The DSVTOC 130 includes a DSVTOC index 135, a DSVTOC cluster 137, and DSVTOC data 140. The DSVTOC index 135, the DSVTOC cluster 137, and the DSVTOC data 140 may be organized as database tables, linked data structures, flat files, or combinations thereof.

The DSVTOC index 135, the DSVTOC cluster 137, and the DSVTOC data 140 may maintain the DSCB data structures to fulfill legacy CVAF and CATALOG requests. The DSVTOC cluster 137 may be a logical definition for the data set 120. The DSVTOC index 135 and DSVTOC data 140 are described hereafter in more detail. The SMS data 136 may include information for the VSAM 105.

Figure 4:
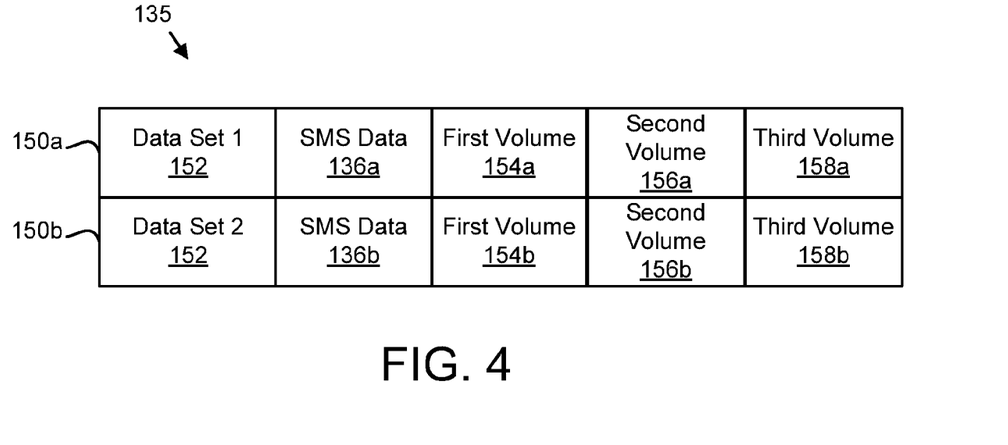
FIG. 4 is a schematic block diagram illustrating one embodiment of a DSVTOC index.

FIG. 4 is a schematic block diagram illustrating one embodiment of a DSVTOC index 135. The DSVTOC index 135 is the DSVTOC index 135 of FIG. 3. The DSVTOC index 135 includes a plurality of entries 150. The entries 150 may be table entries, data structure entries, or the like. In one embodiment, each entry 150 includes a data set field 152, SMS data 136, and one or more volume fields 154, 156, and 158. The data set field 152 may specify the data set 112. The data set field 152 may store a logical name, a physical address, or combinations thereof. The SMS data 136 may include data router related to the SMS. The volume fields 154, 156, 158 may specify each volume such as the volume 120 that stores a portion of the data set 112. The volume fields 154, 156, 158 may store a logical name, a physical address, or combinations thereof.

Figure 5:
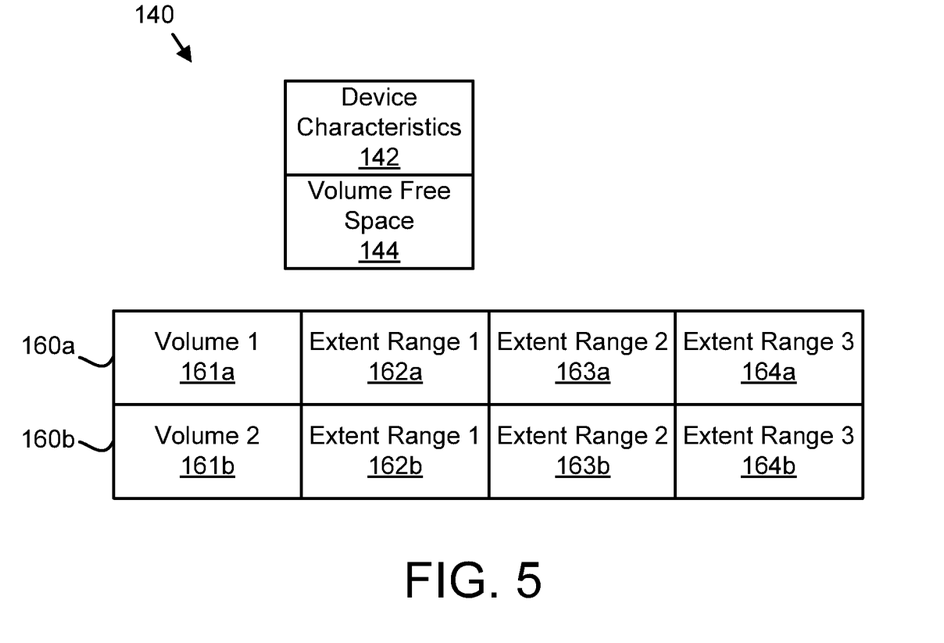
FIG. 5 is a schematic block diagram illustrating one embodiment of DSVTOC data.

FIG. 5 is a schematic block diagram illustrating one embodiment of DSVTOC data 140. The DSVTOC data 140 is the DSVTOC data of FIG. 3. The DSVTOC data 140 includes device characteristics 142 and volume free space 144. The DSVTOC data 140 also include a plurality of entries 160 for each volume storing the data set 112 such as the volume 120.

The device characteristics 142 may describe one or more devices including servers, routers, storage devices, and the like. In one embodiment device characteristics 142 describes the volume 120 and/or storage devices of the volume 120.

The volume free space 144 may list a quantity of free space. The volume free space 144 may be for all volumes. Alternatively, the volume free space 144 may be for a specified volume. The free space may include free extents, free addresses, or combinations thereof.

Each entry 160 may include a volume field 161. The volume field 161 may specify a volume such as volume 1, volume 2, and the like. The volume field 161 may store logical names, physical addresses, or combinations thereof. In addition, each entry 160 may include one or more extent ranges 162, 163, 164. Each extent range 162, 163, 164 may record the starting extent address and an ending extent address for data of the data set 112.

Figure 6:
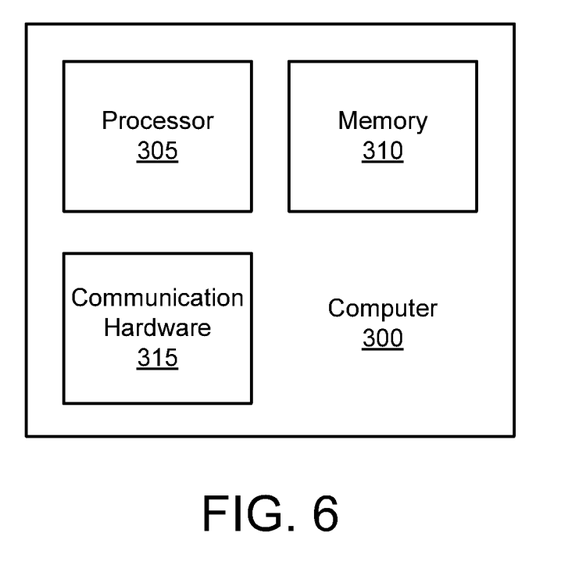
FIG. 6 is a schematic block diagram illustrating one embodiment of a computer.

FIG. 6 is a schematic block diagram illustrating one embodiment of a computer 300. The computer 300 may create and manage the DSVTOC 130. As depicted, the computer 300 includes a processor 305, a memory 310, and communication hardware 315. The memory 310 stores program code. The program code may include data. The memory 310 may be a hard disk drive, an optical storage device, the micromechanical storage device, a semiconductor storage device, a holographic storage device, or the like. The memory 310 may store program code. The processor 305 may execute the program code. The communication hardware 315 communicates with other devices.

Figure 7:
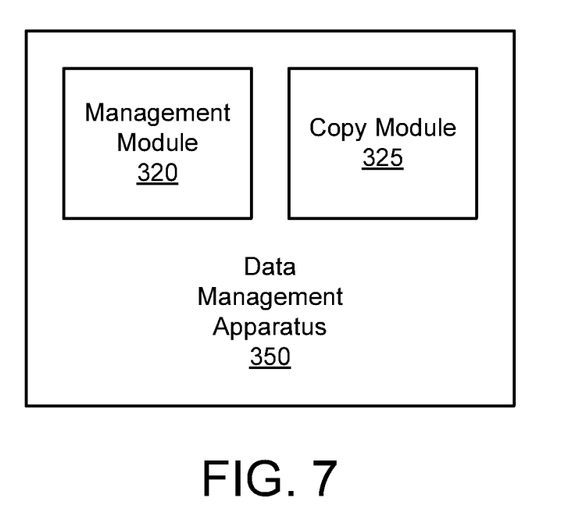
FIG. 7 is a schematic block diagram illustrating one embodiment of a data management apparatus.

FIG. 7 is a schematic block diagram illustrating one embodiment of a data management apparatus 350. The apparatus includes a management module 320 and a copy module 325. The management module 320 and a copy module 325 may be embodied in program code stored in a computer readable storage medium such as the memory 310 and executed by the processor 305.

The management module 320 may create the DSVTOC 130 for the data set 112 residing on the volume 120. The DSVTOC 130 may reside in the VSAM 105 and comprise the SMS data 136, the DSVTOC index 135, the DSVTOC cluster data 137, and the DSVTOC data 140 for the data set 112. The copy module 325 may maintain a copy of the DSVTOC 130 on the volume 120.

Figure 8:
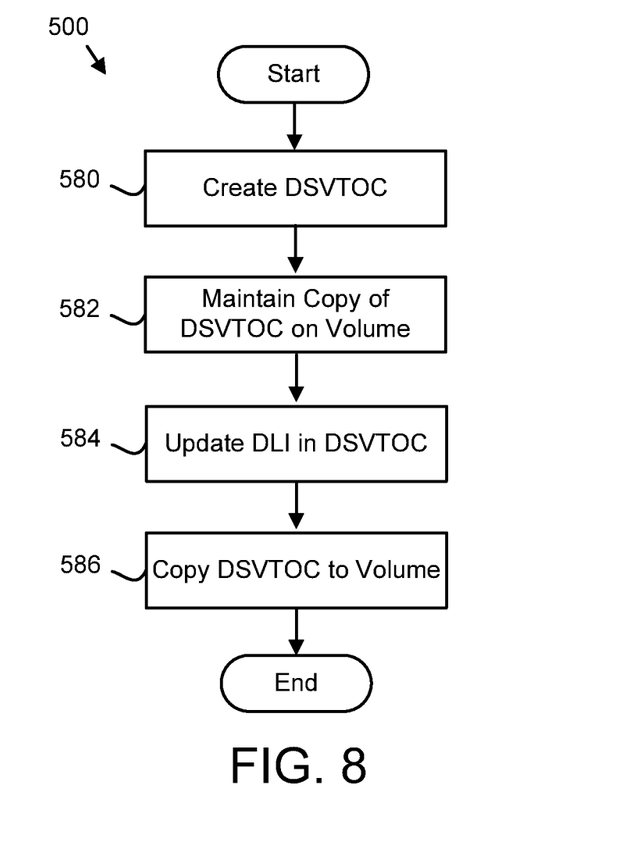
FIG. 8 is a schematic flow chart diagram illustrating one embodiment of a DSVTOC management method.

FIG. 8 is a schematic flow chart diagram illustrating one embodiment of a DSVTOC management method 500. The method 500 may be performed by a computer program product. The computer program product may comprise a computer readable storage medium such as the memory 310. The computer readable storage medium may store program code.

The processor 305 may execute the program code. The method 500 may perform the functions of the apparatus 350.

The method 500 starts, and in one embodiment the management module 320 creates 580 the DSVTOC 130. An ICKDSF facility may be embodied in the ICKDSF 126 and create 580 the DSVTOC 130. The ICKDSF facility may create a cluster for the DSVTOC 130 at cylinder 0, track 0. The ICKDSF facility may also create the DSVTOC index 135, the DSVTOC cluster data 137, and the DSVTOC data 140. The creation 580 of the DSVTOC 130 will be described hereafter in more detail. The management module 320 may create 580 the DSVTOC 130 through a Vector Space Access Structure (VSAS). In a certain embodiment, all communications for creating 580 the DSVTOC 130 go through the VSAS.

The copy module 325 maintains 582 a copy of the DSVTOC 130 on the volume 120. In one embodiment, each time the DSVTOC 130a on the VSAM 105 is modified, a copy module 325 may copy the DSVTOC 130a to the copy of the DSVTOC 130b on the volume 120. Alternatively, the copy module 325 may synchronize the DSVTOC 130b on the volume 120 with a DSVTOC 130a on the VSAM 105.

In one embodiment, the management module 320 may update 584 the DLI for the data set 112 in the DSVTOC data 140 in response to a modification of the data set 112. For example, if the data set 112 is stored to new extents, the volume field 161 and extent ranges 162, 163, 164 for the DSVTOC data 140 may be updated to reflect the new DLI. In addition, the volume free space 144 may be updated to reflect the new quantity of free space available.

In one embodiment, the copy module 325 copies 586 the updated DSVTOC 130 to the volume 120 and the method 500 ends. Alternatively, the copy module 325 may copy 586 the DSVTOC data 140 to each DSVTOC copy 130b on each volume 120. In a certain embodiment, the copy module 325 copies 586 the DSVTOC data 140 to each DSVTOC copy 130b on each volume 120 in response to a data set close command.

Figure 9:
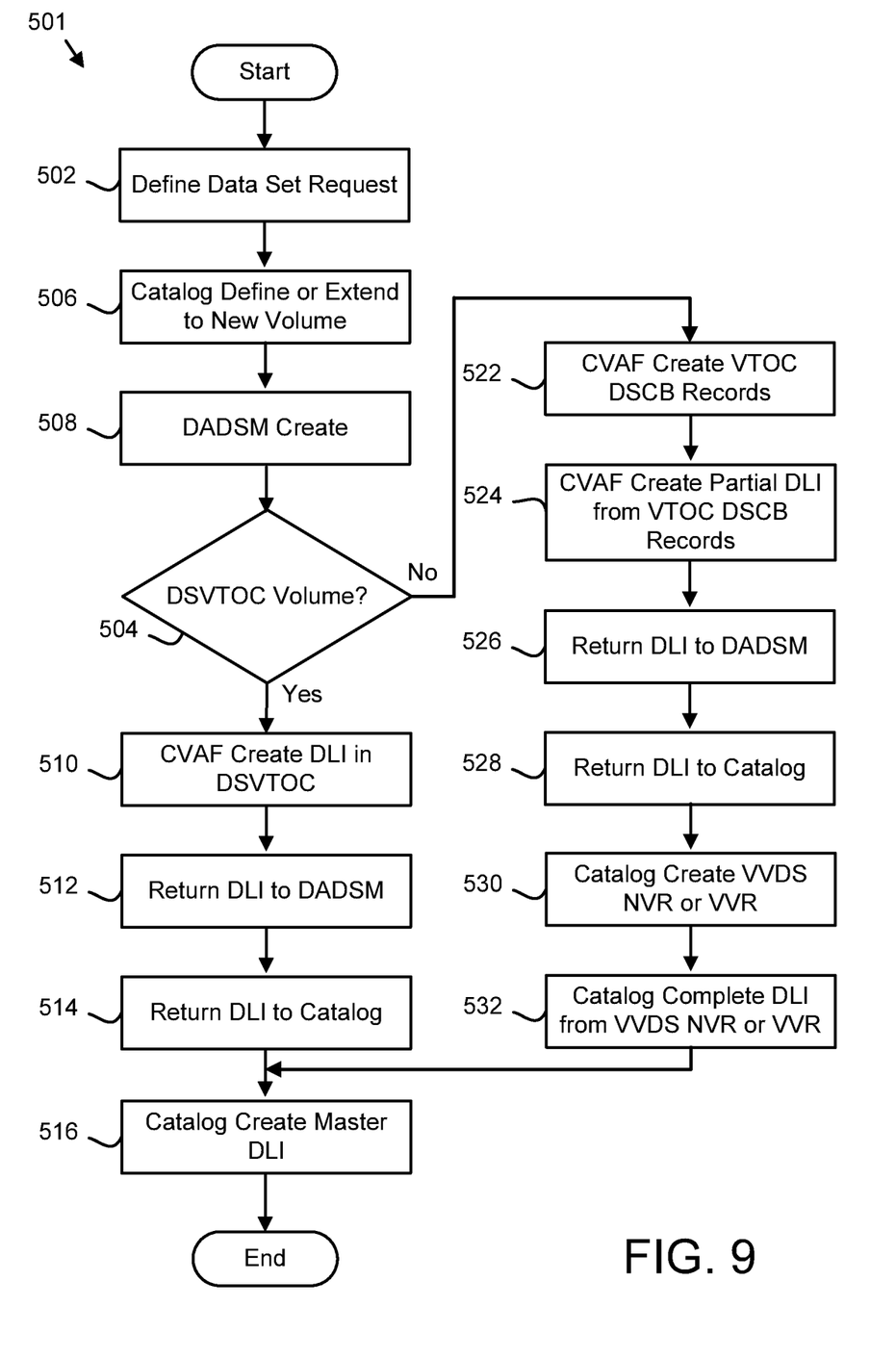
FIG. 9 is a schematic flow chart diagram illustrating one embodiment of a data set definition method.

FIG. 9 is a schematic flow chart diagram illustrating one embodiment of a data set definition method 501. The method 501 may be performed by a computer program product. The computer program product may comprise a computer readable storage medium such as the memory 310. The computer readable storage medium may store program code. The processor 305 may execute the program code. The method 501 may perform the functions of the apparatus 350.

The method 501 starts, and in one embodiment, the management module 320 receives 502 a define data set request. The request may be a VSAM catalog create, a VSAM CVAF create, or the like. If the data set 112 is defined in a new volume 120, the management module 320 may catalog define 506 the data set 112 to a new volume 120. If the data set 112 is extended to a new volume 120, the management module 320 may catalog extend 506 the data set 112 to a new volume 120 to the new volume 120. The catalog define 506 and catalog extend 506 may be a function of the catalog 129.

In one embodiment, the management module 320 performs a DADSM create 508. The DADSM create 508 may be a function of the DADSM 127. The DADSM create 508 may allocate space for the data set 112. In addition, the DADSM create 508 may return one or more diagnostic codes. Alternatively, the DSAM create 508 may be a DASM extended call and/or a DASM scratch call.

The management module 320 determines 504 if the new volume 120 is a DSVTOC volume. The management module 320 may determine 504 from the data set request whether the new volume 120 is a DSVTOC volume. If the new volume 120 is a DSVTOC volume, the management module 320 performs a CVAF create 510 of the DLI in the DSVTOC 130. The CVAF create 510 may be a function of the CVAF 128.

The management module 320 may further return 512 the DLI to the DADSM 127. In addition, the management module 320 may return 514 the DLI to the catalog 129. In one embodiment, the management module 320 performs a catalog create 516 of the master DLI for the data set 112 and the method 501 ends.

If the new volume 120 is not a DSVTOC volume, the management module 320 may perform a CVAF create 522 of VTOC DSCB records. The management module 320 may further perform a CVAF create 524 of partial DLI from the VTOC DSCB records.

The management module 320 may further return 526 the DLI to the catalog 129. In addition, the management module 320 may return 528 the DLI to the DADSM 127.

In one embodiment, the management module 320 performs a catalog create 530 of at least one of a VVDS non-VSAM-record (NVR) and a VVDS VSAM volume record (VVR). The management module 532 may catalog 532 the complete DLI from the VVDS NVR or the VVR. The management module 320 may perform a catalog create 516 of the master DLI for the data set 112 and the method 501 ends.

Figure 10:
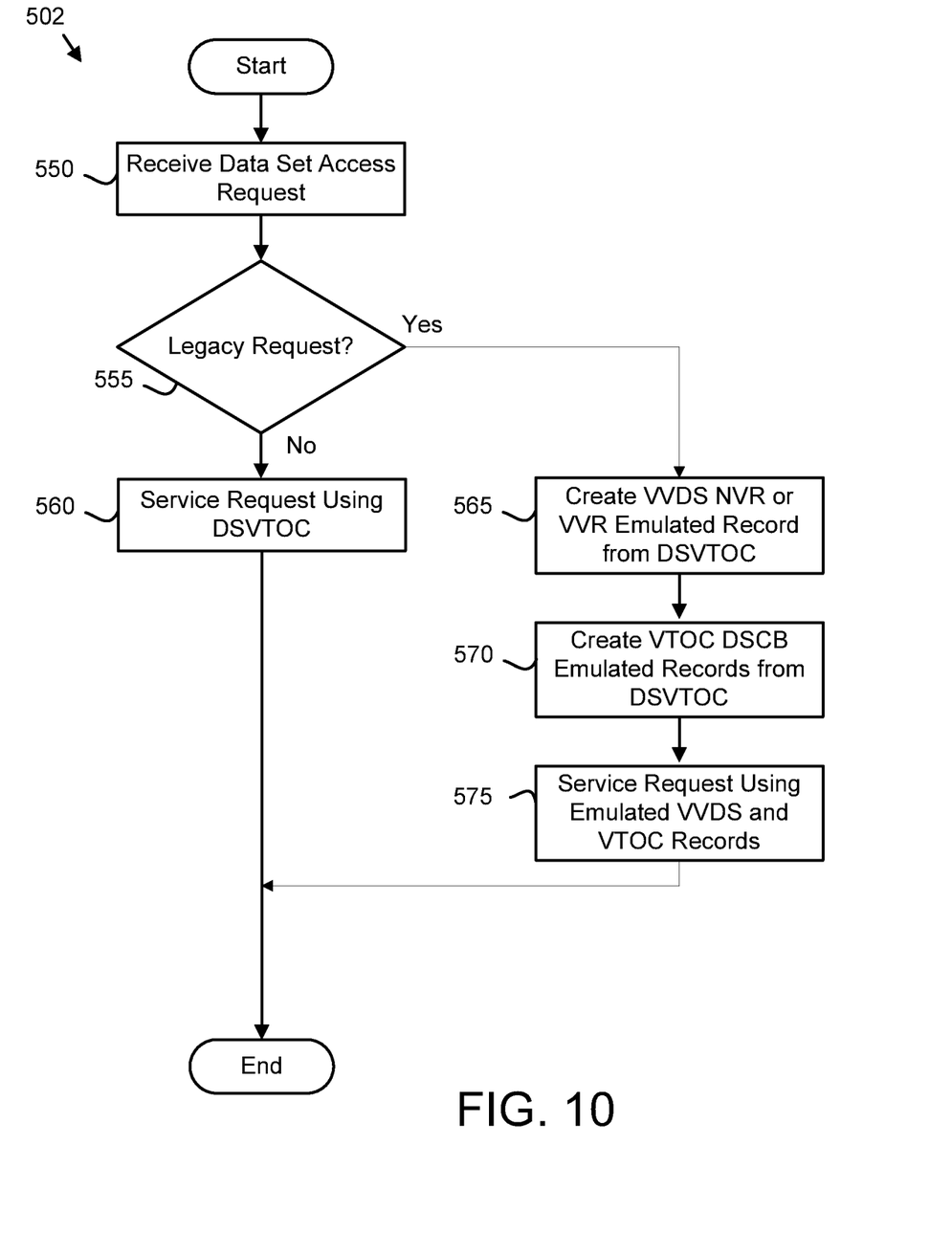
FIG. 10 is a schematic flow chart diagram illustrating one embodiment of a data set access method.

FIG. 10 is a schematic flow chart diagram illustrating one embodiment of a data set access method 502. The method 502 may be performed by a computer program product. The computer program product may comprise a computer readable storage medium such as the memory 310. The computer readable storage medium may store program code. The processor 305 may execute the program code. The method 502 may perform the functions of the apparatus 350.

The method 502 starts, and in one embodiment the management module 320 receives 550 a data set access request referencing the data set 112. The management module 320 determines 555 if the request is a legacy request. A legacy request may reference a VTOC 110 and VVDS 115 for the data set 112. If the management module 320 determines 555 that the request is not a legacy request, the management module 320 may service the request using the DSVTOC 130 and method 502 ends.

If the management module 320 determines 555 that the request is a legacy request, the management module may create 565 a least one of the VVDS NVR emulated records and the VVDS VVR emulated records from the DSVTOC 130. In one embodiment, the management module 320 populates the VVDS NVR or the VVDS VVR emulated records with data from the DSVTOC 130.

The management module 320 may further create 570 VTOC DSCB emulated records from the DSVTOC 130. In one embodiment, the management module 320 populates the VTOC DSCB emulated records with data from the DSVTOC 130. The managing module 320 may service 575 the request using at least one of the VVDS NVR emulated record, the VVDS VVR emulated record, and the VTOC DCSB emulated record and the method 502 ends.

The embodiments increase the efficiency and reliability of managing the data set volume table of contents by consolidating information in the DSVTOC 130. The DSVTOC 130 may be used to service data access requests directly. In addition, the DSVTOC 130 may create emulated VVDS 115 and emulated VTOC 110 records for servicing legacy requests.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer readable storage medium storing program code executable by a processor, the program code comprising:
   a management module creating a data set volume table of contents (DSVTOC) for a data set residing on a volume, the DSVTOC residing in a virtual storage access method (VSAM) system and comprising a DSVTOC index, DSVTOC cluster data, and DSVTOC data for the data set, the DSVTOC data comprising a volume and a plurality of extent ranges;
   the management module receiving a legacy data set access request referencing the data set and referencing a volume table of contents (VTOC) and a VSAM volume data set (VVDS) for the data set;
   the management module creating at least one of a VVDS non-VSAM record (NVR) emulated record populated with data from the DSVTOC and a VVDS VSAM volume record (VVR) emulated record populated with data from the DSVTOC;
   the management module creating VTOC data set control block (DSCB) emulated records that emulate the volume and the plurality of extent ranges;
   the management module servicing the legacy data set access request using the NVR emulated record, the VVR emulated record, and the VTOC DCSB emulated records; and
   a copy module maintaining a copy of the DSVTOC on the volume.

2. The apparatus of claim 1, the management module further:
   performing one of a catalog define and a catalog extend for the data set;
   performing a direct access device space management (DADSM) create;
   performing a common VTOC access facility (CVAF) create of data set level information (DLI) in the DSVTOC;
   returning the DLI to DADSM;
   returning the DLI to a catalog; and
   performing a catalog create of a master DLI.

3. The apparatus of claim 1, wherein the DSVTOC is a data set type selected from one of the group consisting of a VSAM keyed sequence data set and a VSAM entry sequence data set.

4. The apparatus of claim 1, the management module further updating DLI for the data set in the DSVTOC data in response to a modification of the data set and the copy module copying the DSVTOC data to each DSVTOC copy in response to a data set close command.

5. A method for managing a data set volume table of contents comprising:
   creating, by use of a processor, a data set volume table of contents (DSVTOC) for a data set residing on a volume, the DSVTOC residing in a virtual storage access method (VSAM) system and comprising a DSVTOC index, DSVTOC cluster data, and DSVTOC data for the data set, the DSVTOC data comprising a volume and a plurality of extent ranges;
   receiving a legacy data set access request referencing the data set and referencing a volume table of contents (VTOC) and a VSAM volume data set (VVDS) for the data set;
   creating at least one of a VVDS non-VSAM record (NVR) emulated record populated with data from the DSVTOC and a VVDS VSAM volume record (VVR) emulated record populated with data from the DSVTOC;
   creating VTOC data set control block (DSCB) emulated records that emulate the volume and the plurality of extent ranges;
   servicing the legacy data set access request using the NVR emulated record, the VVR emulated record, and the VTOC DSCB emulated records; and
   maintaining a copy of the DSVTOC on the volume.

6. The method of claim 5, further comprising:
   performing one of a catalog define and a catalog extend for the data set;
   performing a direct access device space management (DADSM) create;
   performing a common VTOC access facility (CVAF) create of data set level information (DLI) in the DSVTOC;
   returning the DLI to DADSM;
   returning the DLI to a catalog; and
   performing a catalog create of a master DLI.

7. The method of claim 5, the DSVTOC data comprising device characteristics.

8. The method of claim 5, the DSVTOC data comprising volume free space information.

9. The method of claim 5, wherein the DSVTOC is a VSAM keyed sequence data set.

10. The method of claim 5, wherein the DSVTOC is a VSAM entry sequence data set.

11. The method of claim 5, wherein the DSVTOC is created by a device support facility (ICKDSF).

12. The method of claim 5, further comprising:
    updating DLI for the data set in the DSVTOC data in response to a modification of the data set; and
    copying the DSVTOC data to each DSVTOC copy in response to a data set close command.

13. A computer program product for managing a data set volume table of contents, the computer program product comprising a computer readable storage medium having program code embodied therein, the program code readable/executable by a processor to:
    creating a data set volume table of contents (DSVTOC) for a data set residing on a volume, the DSVTOC residing in a virtual storage access method (VSAM) system and comprising a DSVTOC index, DSVTOC cluster data, and DSVTOC data for the data set, the DSVTOC data comprising a volume and a plurality of extent ranges;
    receiving a legacy data set access request referencing the data set and referencing a volume table of contents (VTOC) and a VSAM volume data set (VVDS) for the data set;
    creating at least one of a VVDS non-VSAM record (NVR) emulated record populated with data from the DSVTOC and a VVDS VSAM volume record (VVR) emulated record populated with data from the DSVTOC;
    creating VTOC data set control block (DSCB) emulated records that emulate the volume and the plurality of extent ranges;
    servicing the legacy data set access request using the NVR emulated record, the VVR emulated record, and the VTOC DSCB emulated records; and
    maintaining a copy of the DSVTOC on the volume.

14. The computer program product of claim 13, further comprising:
    performing one of a catalog define and a catalog extend for the data set;
    performing a direct access device space management (DADSM) create;

performing a common VTOC access facility (CVAF) create of data set level information (DLI) in the DSVTOC;
returning the DLI to DADSM;
returning the DLI to a catalog; and
performing a catalog create of a master DLI.

15. The computer program product of claim 13, further comprising:
updating DLI for the data set in the DSVTOC data in response to a modification of the data set; and
copying the DSVTOC data to each DSVTOC copy in response to a data set close command.

16. A method for integrating a computer program product, comprising integrating program code into a computing system, wherein the code in combination with the computing system performs the following:
creating a data set volume table of contents (DSVTOC) for a data set residing on a volume, the DSVTOC residing in a virtual storage access method (VSAM) system and comprising a DSVTOC index, DSVTOC cluster data, and DSVTOC data for the data set, the DSVTOC data comprising a volume and a plurality of extent ranges;
receiving a legacy data set access request referencing the data set and referencing a volume table of contents (VTOC) and a VSAM volume data set (VVDS) for the data set;
creating at least one of a VVDS non-VSAM record (NVR) emulated record populated with data from the DSVTOC and a VVDS VSAM volume record (VVR) emulated record populated with data from the DSVTOC;
creating VTOC data set control block (DSCB) emulated records that emulate the volume and the plurality of extent ranges;
servicing the legacy data set access request using the NVR emulated record, the VVR emulated record, and the VTOC DSCB emulated records; and
maintaining a copy of the DSVTOC on the volume.

* * * * *